Aug. 17, 1948.  W. A. RAY  2,447,207
FLUID CONTROL VALVE
Original Filed Nov. 6, 1940  2 Sheets-Sheet 1
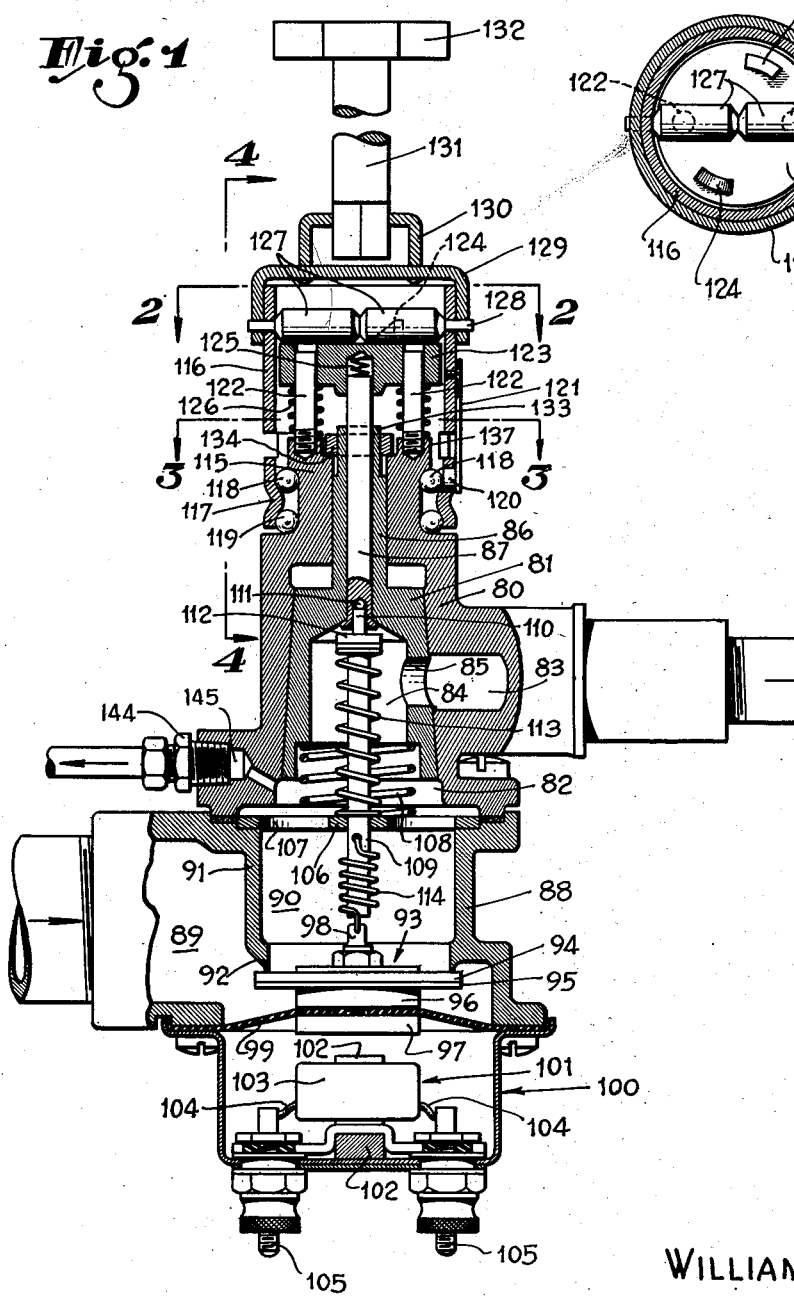
Inventor:
WILLIAM A. RAY,
By John H. Rouse,
Attorney.

Aug. 17, 1948.                    W. A. RAY                    2,447,207
                              FLUID CONTROL VALVE
Original Filed Nov. 6, 1940                              2 Sheets-Sheet 2
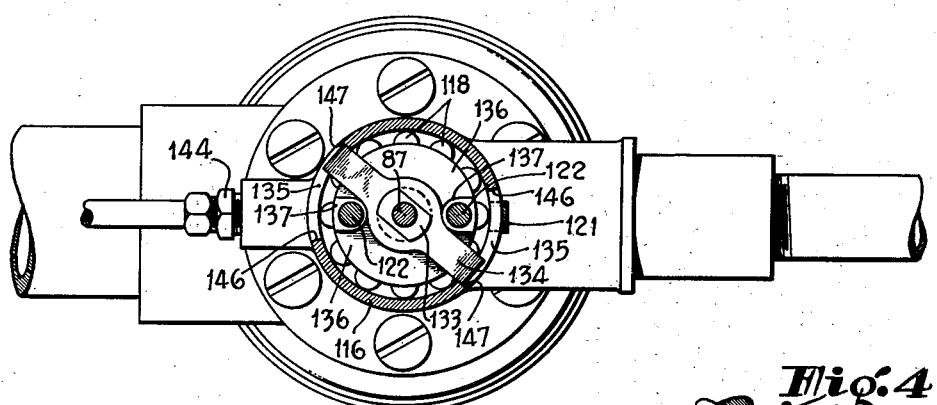
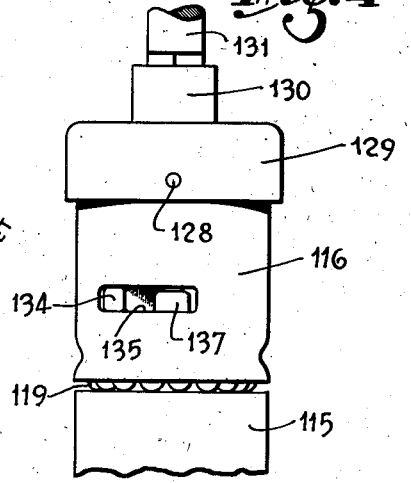
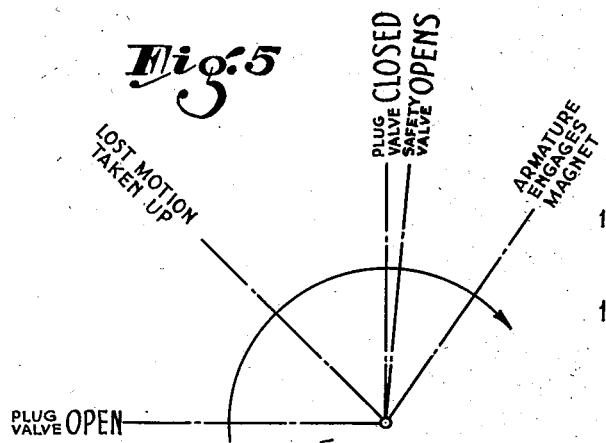
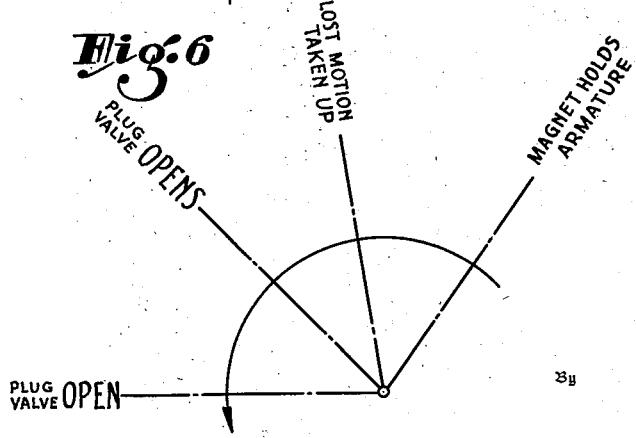
Inventor:
WILLIAM A. RAY,
John H. Rouse,
Attorney.

Patented Aug. 17, 1948

2,447,207

UNITED STATES PATENT OFFICE 2,447,207

FLUID CONTROL VALVE

William A. Ray, Los Angeles, Calif., assignor to General Controls Co., a corporation Original application November 6, 1940, Serial No. 364,524, now Patent No. 2,346,704, dated April 18, 1944. Divided and this application April 11, 1944, Serial No. 530,532.

6 Claims. (Cl. 137—144)

This invention relates to fluid control valves of the type having a plug rotatable to normally control flow through the valve, and a safety closure effective when seated to obstruct said flow; the valve including means, such as an electromagnet or a latch, for temporarily maintaining the safety closure in open position and for returning it to closed position upon establishment of a condition under which it is unsafe or undesirable to permit flow through the valve. The present application is a division of my copending application, Serial No. 364,524, filed November 6, 1940, now Patent Number 2,346,704, granted April 18, 1944.

A main object of the invention is to provide means, operated by or during the rotation of the plug, for resetting the safety closure to its open position.

Another object is to so arrange the resetting means that it is operable only while the plug is in flow-obstructing condition.

Another object is to arrange the resetting means entirely within the valve structure so that it is impossible for a careless person to tamper with the resetting means or to so lock it that the safety closure is maintained in open position regardless of the condition of the electromagnet or other safety device.

Another object is to arrange the plug, the plug operating means, the resetting means, and the safety closure all in coaxial relation so as to form a compact elongated structure which is simple and economical to manufacture.

Other objects and advantages of the invention will be found in the description, the drawing, and the claims; and, for full understanding of the invention, reference may be had to the following detailed description and accompanying drawing, wherein:

Figure 1 is a longitudinal sectional view of a valve structure embodying the invention;

Figures 2 and 3 are transverse sections taken, respectively, along the lines 2—2 and 3—3 of Fig. 1;

Figure 4 is a side elevation taken on the line 4—4 of Fig. 1; and

Figures 5 and 6 are graphs illustrating the operation of the valve shown in the other figures.

In the drawing, the numeral 80 indicates a valve casing wherein is rotatably seated a hollow tapered plug 81 which controls fluid flow from the space or chamber 82 below it to an outlet 83; the fluid passing through the cavity 84 of the plug and a lateral opening 85 registering with the outlet 83 when the plug is in open position.

The reduced cylindrical upper portion 86 of the plug extends through a bore in the upper portion of the casing 80 and is concentrically bored to receive a rod 87 which has a flanged lower end cooperable, when the rod is in elevated position, with the surface surrounding the bottom of this bore to prevent leakage of fluid therethrough.

Secured to the open bottom end of the casing 80 is a safety-valve casing 88 having an inlet 89 and an outlet 90 separated by a ported partition 91 providing an annular valve seat 92. Cooperable with this seat is a closure 93 comprising a disk 94 of resilient material, such as artificial rubber, backed by a metal washer 95, a spacing disk 96, and a disk or armature 97 of magnetic material; these parts being held together by a threaded stem 98. The closure is guided by a flexible diaphragm 99, interposed between the disk 96 and the armature, which covers an opening in the bottom wall of the casing 88 and is secured thereto at its margin by the flange of a housing 100. Mounted on the bottom wall of this housing is an electromagnet 101 comprising a U-shaped core 102 and an energizing coil 103 therefor which surrounds a portion of one of the arms of the core. The leads 104 of the coil are connected to the inner ends of terminals 105 which insulatingly extend through the housing wall. The electromagnet, when energized, is adapted to magnetically hold the armature 97, against a force urging it away, only when it is first mechanically brought into engagement with the pole faces of core 102 by means hereinafter described; the electromagnet is not adapted to attract the armature through space.

Mounted at its margin in an annular recess formed in the upper surface of casing 88 adjoining casing 80 is a plate 106 having openings 107 through which fluid can pass from the safety valve outlet 90 to the plug valve chamber 82 and cavity 84. Compressed between this plate and a shoulder formed by a lower enlargement of the cavity 84, is a spring 108 which urges the plug against its tapered seat. Extending through a central opening in plate 106 is a rod 109 having a reduced upper end portion 110 which is received in the shallow bore formed in the bottom end of rod 87, a ball 111 being interposed between the rods to minimize friction due to relative rotation of the rods. Compressed between the plate 106 and an enlarged upper portion 112 of rod 109 is a relatively stiff spring 113 which urges the rods 109 and 87 upwardly. Connected to a lower portion of rod 109 below the plate 106 and to the stem 98 of the safety-valve closure 93 is a contractile spring 114 which urges the closure upwardly into engagement with its seat. The force exerted by spring 114, in all positions of the closure, is less than that of spring 113, so that upward movement of rod 109 is not materially impeded by this spring. The general structure of the safety valve described above is disclosed and claimed in Patent No. 2,299,654, granted to me October 20, 1942.

Rotatable on a reduced cylindrical upper portion 115 of the plug-valve casing 80 is a tubular member 116 which, toward its lower end, is provided with a circumferentially depressed portion 117 which serves as a division between an upper and a lower row of balls 118 and 119, respectively, which revolve in a ball race circumferentially formed in the portion 115; the balls which form the upper row being introduced, in assembly, through a lateral opening in member 116 which is normally closed by a plug 120 carried by a flexible arm 121 secured to the member. By this arrangement, the member 116 is freely rotatable but is restrained from longitudinal movement.

Guided on a pair of pins 122, threaded in the top part of the portion 115, is a disk or head 123, from the upper surface of which extends a pair of integrally formed cams 124. The head 123 is provided in its underside with a shallow concentric bore for the reception of rod 87, a short stiff spring 125 being interposed between the rod and the head. The head is urged upwardly by springs 126 on the pins 122, so that its upper surface is normally in engagement with a pair of rollers 127 which are rotatably mounted on a pin 128 which extends through openings in the wall of member 116 and that of a cup-shaped member 129 which surrounds the upper end of member 116. To the cup-shaped member 129 is secured a similar, but smaller, member 130 which has an opening through its upper wall which conforms to and receives the squared end of a shaft 131, which shaft is provided with a handle 132 for manual operation of the valves. The cylindrical upper end portion 86 of the valve plug is cut away to provide a portion 133 (Fig. 3) having parallel sides. A member 134, having a central opening conforming to the cross-sectional shape of this portion, is mounted thereon; the opposide arms of this member extending into elongated openings 135 formed in the wall of the tubular member 116. The surface of the upper end portion 115 of the plug-valve casing is recessed at 136 (Fig. 3), between the portions 137 in which the pins 122 are mounted, to provide a space wherein the member 134 is rotatable through an angle of approximately 90°, its movement in either direction being limited by the engagement of its arms with the portions 137.

The operation of the device shown in Figs. 1–4 will now be described; it being assumed that the inlet 89 of the safety valve is connected to a source of fuel gas; that the outlet 83 of the plug valve is connected to a main burner; that the chamber 82 is connected to a pilot burner for the main burner, by means of a fitting 144 threaded in an opening 145 in the side of casing 80 communicating with this chamber; and that the terminals 105 of the electromagnet are connected to a thermoelectric generating device adapted to be heated by the flame of the pilot burner. With the parts in the positions shown, the plug valve is open but the safety valve is closed, and accordingly the gas cannot flow to the main burner or to the pilot burner. Such condition of the parts would be the result of accidental extinguishment of the pilot burner flame while the burner system was in operation, as will be explained hereinafter.

To "reset" the safety valve to reinitiate operation of the burner control system, the handle 132 (and therewith the cap formed by the members 129 and 116) is rotated in a clockwise direction as viewed from above, the resulting sequence of events being graphically shown in Fig. 5. The cylindrical member 116 rotates freely until the edges 146 of the openings 135 therein engage the arms of the member 134, this point being indicated in the graph by the legend "Lost motion taken up." In the continued movement of the member 116, the member 134 is rotated thereby; which member, by its connection with the stem of plug 81, rotates the same toward closed position. When the plug has been rotated through approximately 45°, its opening 85 is completely closed, as indicated in the graph. A few degrees beyond this point, the rollers 127 engage the lower portions of the cams 124 with the result that, upon continued rotation, the head 123 is forced downwardly, guided and restrained from rotation by the pins 122, carrying with it the rods 87 and 109. When the rod 109 is moved through a distance slightly greater than the space between its lower end and the upper end of the safety-closure stem 98, the safety valve opens, as indicated in the graph. Gas can now flow from the inlet 89 to the pilot burner through the safety-valve outlet 90, chamber 82 and opening 145. Continued downward movement of the head 123, as the rollers ride on the cams, finally effects engagement of the armature 97 with the pole faces of the electromagnet core 102, as indicated at the end of the graph; the short stiff spring 125 at the upper end of rod 87 preventing undue pressure on the core. Further movement of the parts is arrested by engagement of the arms of member 134 with the top portions 137 of the plug-vale casing. It will be noted that the plug 81 is still in closed condition.

After lighting the pilot burner, the operating handle is manually retained in the position wherein the armature is in engagement with the electromagnet core until the thermoelectric generating device has been sufficiently heated by the pilot burner flame to generate current in such amount as to energize the core to magnetically hold the armature in engagement therewith. The handle may then be released, the rods 87 and 109 moving upwardly under the force of spring 133 and causing backward rotation of member 116 (and of the handle); the rollers riding down the cams until they rest on the surface of the cam head, when farther movement of the rods is arrested. In the upward movement of rod 109, the spring 114 connecting the closure 93 to this rod is stretched, exerting a substantial force acting to close the safety valve in the event of deenergization of the electromagnet resulting from failure of the pilot burner flame. As has been mentioned above, the force of spring 114, even in its stretched condition, is less than that of spring 113 so that upward movement of rods 87 and 109 is not materially impeded.

When, after the resetting operation, the handle is released, it assumes a position such that the edges 147 of the openings 135 in member 116 are close to the arms of member 134, so that upon slight rotation of the handle in a counterclockwise direction the parts are in position to move the valve plug to its open position; as is indicated in the graph of Fig. 6 by the legend "Lost motion taken up." When the handle is now rotated through approximately 40°, the plug starts to open and is fully open when moved through an additional 45°; both of these points being indicated in the graph. In the fully-open position of the plug, the arms of member 134 are in engagement with the portions 137 of casing 80. Gas can now flow to the main burner where it is ignited by the pilot burner flame. In normal operation, the handle is rotated in either direction to control the main burner. If the pilot burner flame is extinguished, the safety valve closes and supply of gas to both the pilot and the main burner is obstructed, regardless of the condition of the plug valve.

The embodiment of my invention herein shown and described is obviously susceptible of modification without departing from the spirit of the invention, and I intend therefore to be limited only by the scope of the appended claims.

I claim as my invention:

1. In a valve structure, in combination: an elongated body; a plug seated in one end portion of said body and rotatable on the general axis of the body to normally control flow through said structure; a safety valve closure reciprocable generally along the axis of said plug in the opposite end portion of the body and effective, when seated, to obstruct flow through the structure; means for temporarily maintaining said safety closure in open position; an elongated member sealingly reciprocable in an axial opening through said plug, one end of the member extending exteriorly of the body at said one end thereof and there being provided with a head, the other end of the member being operatively engageable with the safety closure; a cap rotatably mounted on said one end of the body and having a connection for rotating said plug, said connection permitting limited rotation of the cap with respect to the plug; and cam means cooperating with said head and said cap whereby, when the cap is rotated while the plug is in flow-obstructing condition, said member is operated to effect movement of the safety closure to said open position.

2. In a valve structure, in combination: an elongated body; a plug seated in one end portion of said body and rotatable on the general axis of the body to normally control flow through said structure; a safety valve closure reciprocable generally along the axis of said plug in the opposite end portion of the body and effective, when seated, to obstruct flow through the structure; means for temporarily maintaining said safety closure in open position; an elongated member sealingly reciprocable in an axial opening through said plug, one end of the member extending exteriorly of the body at said one end thereof and there being provided with a head, the other end of the member being operatively engageable with the safety closure; a cap rotatably mounted on said one end of the body and having a connection for rotating said plug; means for preventing rotation of said head relative to the body; means on said head forming a cam; and means within said cap engageable with said cam when the cap is rotated, and while said plug is in flow-obstructing condition, for so operating said member as to effect movement of the safety closure to said open position.

3. In a valve structure, in combination: an elongated body; a plug seated in one end portion of said body and rotatable on the general axis of the body to normally control flow through said structure, said plug having a portion extending exteriorly of the body at said one end thereof; a safety valve closure reciprocable generally along the axis of said plug in the opposite end portion of the body and effective, when seated, to obstruct flow through the structure; means for temporarily maintaining said safety closure in open position; an elongated member sealingly reciprocable in an axial opening through said plug, one end of the member extending outwardly beyond said extended portion of the plug and being there provided with a head, the other end of the member being operatively engageable with the safety closure; a cap rotatably mounted on said one end of the body; means cooperating with said cap and said extended portion of the plug whereby rotation of the cap effects rotation of the plug, said last-named means including means permitting rotation of the cap with respect to the plug through a limited arc; means for preventing rotation of said head with respect to the body; means on said head forming a cam; and means within said cap and engageable with said cam when the cap is rotated, and while said plug is in flow-obstructing condition, for so operating said member as to effect movement of the safety closure to said open position.

4. In a valve structure, in combination: an elongated body; a plug seated in one end portion of said body and rotatable on the general axis of the body to normally control flow through said structure, said plug having a portion extending exteriorly of the body at said one end thereof; a safety valve closure reciprocable generally along the axis of said plug in the opposite end portion of the body and effective, when seated, to obstruct flow through the structure; means for temporarily maintaining said safety closure in open position; an elongated member sealingly reciprocable in an axial opening through said plug, one end of the member extending outwardly beyond said extended portion of the plug and being there provided with a head, the other end of the member being operatively engageable with the safety closure; an arm secured to said extended portion of the plug and projecting radially therefrom; a cup-shaped cap rotatably mounted on said one end of the body and having an opening in its side wall through which said arm projects so that rotation of the cap can effect rotation of the plug, said cap-opening being elongated to permit limited rotation of the cap with respect to the arm and plug; means for preventing rotation of said head with respect to the body; means on said head forming a cam; and means within said cap and engageable with said cam when the cap is rotated, and while said plug is in flow-obstructing condition, for so operating said member as to effect movement of the safety closure to said open position.

5. In a valve structure, in combination: an elongated body; a plug seated in one end portion of said body and rotatable on the general axis of the body to normally control flow through said structure, said plug having a portion extending exteriorly of the body at said one end thereof; a safety valve closure reciprocable generally along the axis of said plug in the opposite end portion of the body and effective, when seated, to obstruct flow through the structure; means for temporarily maintaining said safety closure in open position; an elongated member sealingly reciprocable in an axial opening through said plug, one end of the member extending outwardly beyond said extended portion of the plug and being there provided with a head, the other end of the member being operatively engageable with the safety closure; a cup-shaped cap rotatably mounted on said one end of the body; means cooperating with said cap and said extended portion of the plug whereby rotation of the cap effects rotation of the plug, said last-named means permitting limited rotation of the cap with respect to the plug; means for preventing rotation of said head with respect to the body; means on said head forming a cam; and a roller journaled in the side wall of said cap and engageable with said cam when the cap is rotated for so operating said member as to effect movement of the safety closure to open position while the plug is in flow-obstructing condition.

6. In a valve structure, in combination: an elongated body; a plug seated in one end portion of said body and rotatable on the general axis of the body to normally control flow through said structure, said plug having a portion extending exteriorly of the body at said one end thereof; a safety valve closure reciprocable generally along the axis of said plug in the opposite end portion of the body and effective, when seated, to obstruct flow through the structure; means for temporarily maintaining said safety closure in open position; an elongated member sealingly reciprocable in an axial opening through said plug, one end of the member extending outwardly beyond said extended portion of the plug and being there provided with a head, the other end of the member being operatively engageable with the safety closure; an arm secured to said extended portion of the plug and projecting radially therefrom; a cup-shaped cap rotatably mounted on said one end of the body and having an opening in its side wall through which said arm projects so that rotation of the cap can effect rotation of the plug, said cap-opening being elongated to permit limited rotation of the cap with respect to the arm and plug; means for preventing rotation of said head with respect to the body; means on said head forming a cam; and a roller journaled in the side wall of said cap and engageable with said cam when the cap is rotated for so operating said member as to effect movement of the safety closure to open position while the plug is in flow-obstructing condition.

WILLIAM A. RAY.

REFERENCES CITED

The following references are of record in the file of this patent:

UNITED STATES PATENTS

| Number | Name | Date |
| --- | --- | --- |
| 1,330,379 | Lutolf | Feb. 10, 1920 |
| 1,852,682 | Steen | Apr. 5, 1932 |
| 2,213,844 | Mantz | Sept. 3, 1940 |
| 2,303,011 | Weber | Nov. 24, 1942 |
| 2,318,823 | Wantz | May 11, 1943 |

FOREIGN PATENTS

| Number | Country | Date |
| --- | --- | --- |
| 716,807 | France | 1931 |